US005903963A

United States Patent [19]

[11] Patent Number: 5,903,963
[45] Date of Patent: May 18, 1999

Bella et al.

[54] FASTENING SYSTEM FOR USE WITH PICTURE FRAME

[75] Inventors: John L. Bella, Cookeville; Ralph A. Jones, Silver Point; Ronald A. Bernhardt, Baxter, all of Tenn.

[73] Assignee: Esselte Corporation, Garden City, N.Y.

[21] Appl. No.: 08/839,095

[22] Filed: Apr. 23, 1997

Related U.S. Application Data

[60] Provisional application No. 60/016,160, Apr. 24, 1996.

[51] Int. Cl.⁶ ...... B23P 11/00

[52] U.S. Cl. ...... 29/243.5; 29/243.56; 29/283.5

[58] Field of Search ...... 269/158, 159, 269/238, 41, 42; 29/283.5, 243.5, 243.56

[56] References Cited

U.S. PATENT DOCUMENTS

| | | | |
|---|---|---|---|
| 790,880 | 5/1905 | Boyer | 269/159 |
| 3,682,467 | 8/1972 | Heinrich | 269/41 |
| 3,944,200 | 3/1976 | Huntley | 269/42 |
| 4,084,802 | 4/1978 | Cannon | 269/41 |

*Primary Examiner*—Robert C. Watson
*Attorney, Agent, or Firm*—Darby & Darby

[57] ABSTRACT

A crimping machine for securing an elongated frame member to a clip comprises a base that has an upper portion. A table is attached to the upper portion of the base. A foot-operated lever is pivotally attached to the base between a rest position and a depressed position. A crimping assembly is mounted to the table and includes a backstop for supporting a frame member and a clip, and a crimping die which is adapted to crimp a selected portion of the frame member into the clip. The crimping die is movable between a rest position wherein it is located remote from the backstop and a crimping position wherein its is located adjacent to the backstop. Translation means is provided for translating movement of the foot-operated lever from its rest position to its depressed position into corresponding movement of the crimping die from its rest position to its crimping position. The result is that movement of the foot-operated lever forces selective portions of the frame into the clip.

A brace for use with a picture frame of the type including a plurality of frame members wherein each frame member has a longitudinal fastening channel that is adapted to longitudinally receive a corner fastener at each end. The corner fasteners are used to secure adjacent frame members together to form an assembled frame. The brace comprises an elongated brace member and an end clip. Attaching means is provided for attaching a first portion of the end clip to an end of the brace member. Transverse attaching means is provided for attaching a second portion of the end clip to the fastening channel of a selective frame member so that the end clip may be attached to an assembled frame independent of longitudinal access to the fastening channel at the ends of the frame members.

6 Claims, 6 Drawing Sheets

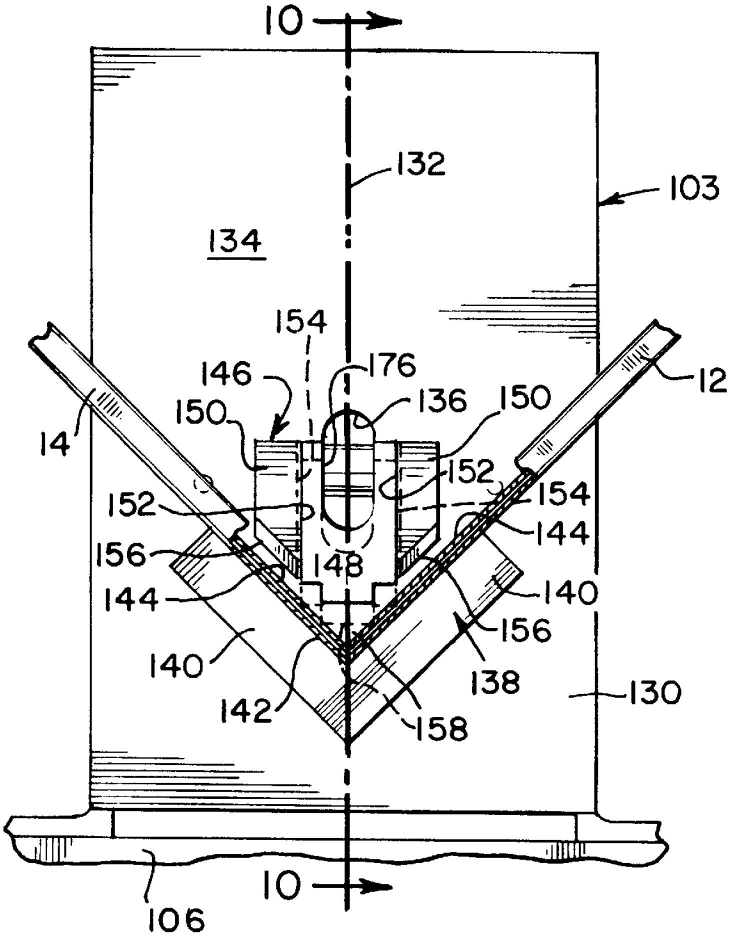
FIG. 9
FIG. 10
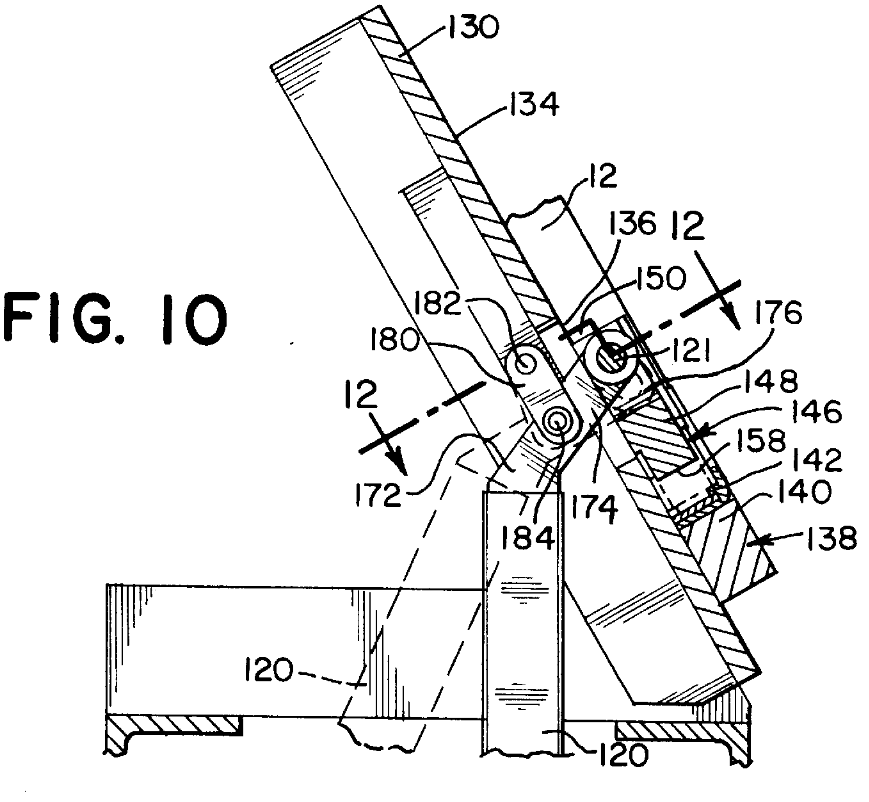

FASTENING SYSTEM FOR USE WITH PICTURE FRAME

CLAIM FOR PRIORITY

Applicant hereby claims priority under 35 U.S.C. §119 based on provisional patent application Ser. No. 60/016,160, filed: Apr. 24, 1996.

FIELD OF THE INVENTION

The present invention generally relates to improvements in assembling and supporting a commercially available and popular type of picture frame. In particular, the present invention relates to an inexpensive crimping machine used to connect the individual frame members of the prior art together and a supporting brace system which is attached to opposing frame members of the prior art to help prevent the assembled frame from sagging under the weight of heavy or large pictures. Such sagging is not only unsightly, it can lead to detachment of frame elements in extreme situations.

BACKGROUND OF THE INVENTION

There are several different types of picture frames commercially available today. The standard rectangular frame is constructed from four straight members connected at mitered ends using one of a variety of fasteners at each of the four corners. The frame members may be made from a variety of materials including wood, plastic and extruded or formed metal, such as aluminum.

Among the metal picture frames commercially available, there are two types of interest. First, a "side-loading" type of metal frame must be assembled, effectively around a picture laminate, thereby "capturing" the picture within an inwardly directed channel. The term "picture laminate is used to collectively describe a layered assembly including at least one of the following: a picture, a backing, a front sheet of glass or plastic, and a matte board. The picture laminate is inserted into the channels of three connected frame members (side loaded into the frame) and held in position by the securing of the fourth and last frame member to the other three members. Each frame member of the side-loading type of metal frame includes a structure having two channels which provide longitudinal rigidity to the frame member, and therefore, a strong assembled frame. Owing to its strength, this type of picture frame is suitable for large and/or heavy pictures where the weight of the picture may otherwise sag or bow other types of non-reinforced, less-rigid frame members.

Although the side-loading type of picture frame is useful in framing large and/or heavy pictures, the frame members are expensive to manufacture and the connecting system required to secure each frame member together is relatively complex, making assembly of a side-loading type of frame a time-consuming procedure.

As shown in FIGS. 1–3, labelled "Prior Art", a second back-loading type of metal prior art picture frame includes a corner joining bracket or clip 10 (hereinafter called "clip 10"), a first frame member 12, and an adjacent second frame member 14. Clip 10 comprises two transverse legs 26 and is typically made from a flat steel stock. It includes a longitudinal axis 16, an upper edge 18, and a lower edge 20.

Located along both upper edge 18 and lower edge 20 of each leg 26 of clip 10 is at least one slot 28. The prior art clips 10 typically include two slots 28 positioned along upper edge 18 and lower edge 20 of each leg 26, as discussed below, and as shown in FIGS. 1–3.

Frame members 12, 14 are usually metal and manufactured through an extrusion or metal forming process. The frame members 12, 14 shown in FIGS. 1–3 are two of a typical four frame member set used in the making of a conventional rectangular frame. A mitered cut (at forty-five degrees) is formed at each end of frame members 12, 14 so that when secured end to end, the combined angle ninety 90 degrees.

Formed integrally with each frame member is a side wall 30 having an outer surface 32, an inner surface 34, an upper edge wall 36, a lower edge wall 38. A front wall 40 is formed integrally with lower edge wall 38 and oriented generally perpendicular to side wall 30 and directed inwardly (towards the center of a completed picture frame). Front wall 40 includes an outer surface 42 and an inner surface 44. Extending perpendicularly to and formed integrally with inner surface 42 of front wall 40 is a lower deformable flange 46. An upper deformable flange 48 is similarly formed integrally with and extends perpendicularly from upper edge wall 36. Upper and lower deformable flanges 46, 48 are coplanar and directed towards each other. The distance between inner surface 34 of side wall 30 and deformable flanges 46, 48 is approximately equal to (or at east slightly greater than) the thickness of clip 10. Deformable flanges 46, 48 and inner surface 34 together define a fastening channel 50 which is sized and shaped to snugly receive a single leg 26 of clip 10.

Referring to FIGS. 2 and 3, two adjacent frame members 12, 14 have been fitted together along two adjacent mitered ends using clip 10. Each leg 26 of clip 10 is positioned within fastening channel 50 of each frame member 12, 14 so that the mitered ends tightly abut each other. Once in position, as described in greater detail below, and at predetermined press points 52, a portion of each deformable flange 46, 48 is displaced inwardly (using a pneumatically powered crimping machine, not shown) into fastening channel 50 (towards the inner surface 32) through slots 28 of clip 10. The press points engage within each respective slot 28 of clip 10 and bind each respective leg 26 within fastening channel 50. The result is that clip 10 is pressed into a holding position within fastening channel 50 thereby securing two adjacent frame members together.

Once a back-loading type of picture frame is assembled, the picture laminate is loaded to the frame from behind and secured to the frame using appropriate spring-clips.

Although the back-loading type of metal picture frame is less expensive to manufacture and easier to use compared to the side-loading type of frame, it lacks rigidity and longitudinal strength and is therefore susceptible to sagging or bowing under the weight of a large or otherwise heavy picture. When a heavy metal frame is hung, the weight of the frame and picture can exert an inward force on the vertical frame members, causing them to sag. Deformation of the vertical frame members will, in turn, cause the upper and lower horizontal frame members to bow. In extreme situations, the bowing of the horizontal members can dislodge the connectors in the corners of the frame which are used to hold adjacent frame members together.

Furthermore, the pneumatically powered crimping machine used to attach each frame members to a corner clip is expensive to manufacture and potentially dangerous to operate. Pneumatically powered machines perform a prescribed crimping procedure once triggered by an operator. The actual crimping operation is completed automatically very quickly and is not directly controlled by the operator (after triggering).

It is therefore an object of the invention to provide a crimping machine for crimping corner clips to respective frame members of back-loading type picture frames which is portable, inexpensive to manufacture and safe and easy to operate.

It is another object of the invention to provide a cross brace that may be quickly and easy secured to and removed from a back-loading type of picture frame to prevent sagging and bowing of the frame after it has been hung.

SUMMARY OF THE INVENTION

A crimping machine for securing an elongated frame member to a clip comprises a base that has an upper portion. A table is attached to the upper portion of the base. A foot-operated lever is pivotally attached to the base between a rest position and a depressed position. A crimping assembly is mounted to the table and includes a V-shaped backstop (hereinafter called "backstop") for supporting a frame member and a clip, and a crimping die which is adapted to crimp a selected portion of the frame member into the clip. The crimping die is movable between a rest position wherein it is located remote from the backstop and a crimping position wherein its is located adjacent to the backstop. Translation means is provided for translating movement of the foot-operated lever from its rest position to its depressed position into corresponding movement of the crimping die from its rest position to its crimping position. The result is that movement of the foot-operated lever forces selective portions of the frame into the clip.

A brace for use with a picture frame of the type including a plurality of frame members wherein each frame member has a longitudinal fastening channel that is adapted to longitudinally receive a corner fastener at each end. The corner fasteners are used to secure adjacent frame members together to form an assembled frame. The brace comprises an elongated brace member and an end clip. Attaching means is provided for attaching a first portion of the end clip to an end of the brace member. Transverse attaching means is provided for attaching a second portion of the end clip to the fastening channel of a selective frame member so that the end clip may be attached to an assembled frame independent of longitudinal access to the fastening channel at the ends of the frame members.

BRIEF DESCRIPTION OF THE DRAWINGS

FIG. 9 is a front partial view of a work support table of the frame-member fastening machine showing details of a crimping head and a frame-member supporting surface;

FIG. 10 is a sectional view of the work support table of the frame-member fastening machine, taken along the lines 10—10 of FIG. 9;

DETAILED DESCRIPTION OF THE PREFERRED EMBODIMENTS

Figure 4:
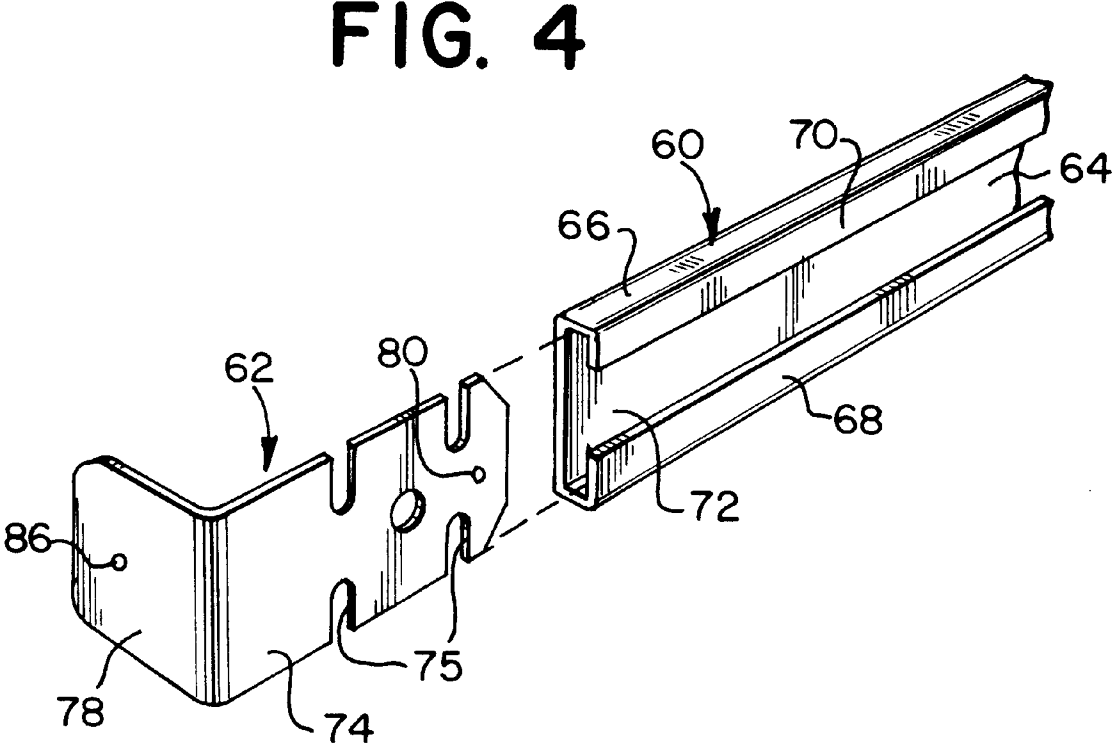
FIG. 4 is a perspective view of a brace-clip and a brace member prior to the brace-clip being secured to the brace member, in accordance with the invention.
Figure 4A:
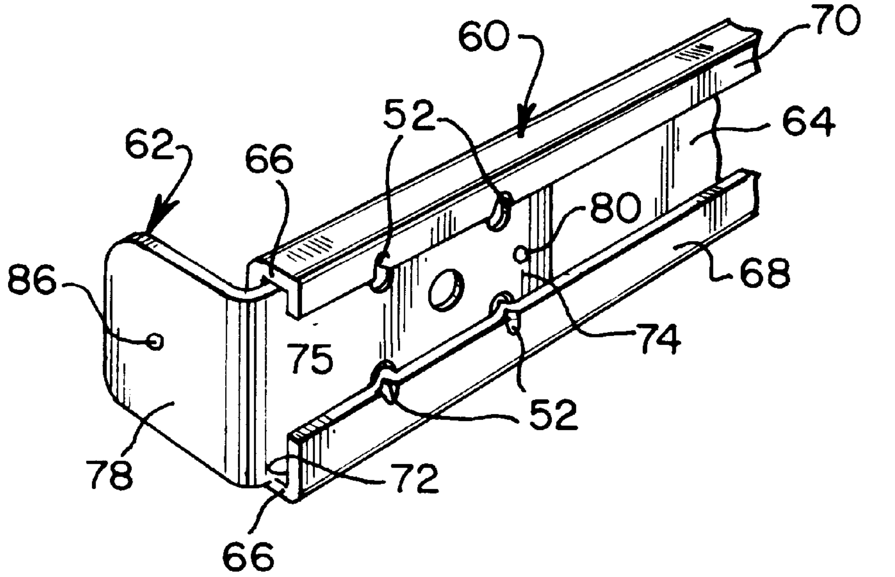
FIG. 4A is a perspective view of the brace-clip and brace member of FIG. 4 after they have been crimped together.
Figure 6:
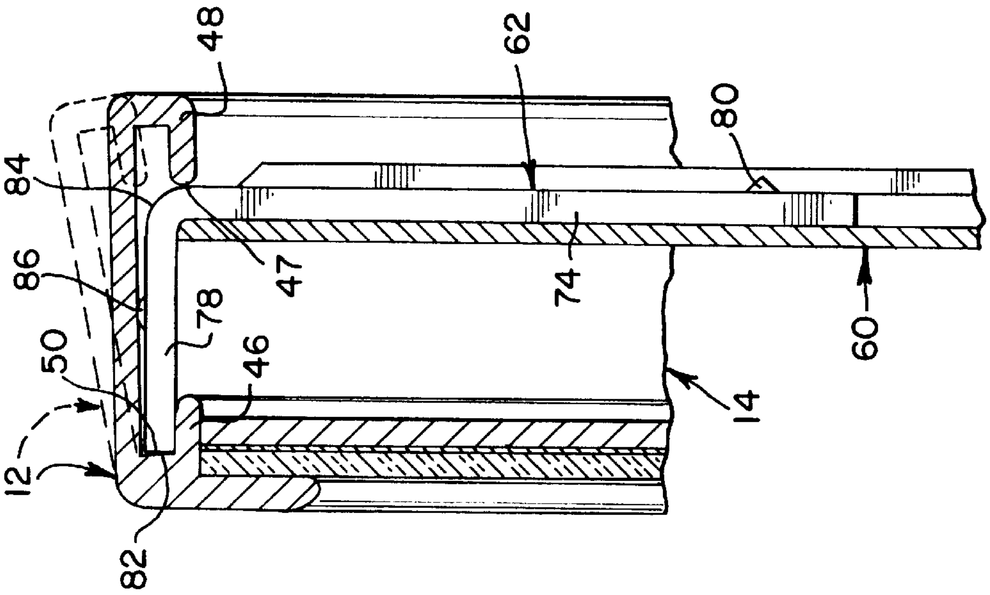
FIG. 6 is a partial sectional view of brace clip being secured to the fastening channel of a frame member, in accordance with the invention, taken along the lines 6—6 of FIG. 5.
Figure 5:
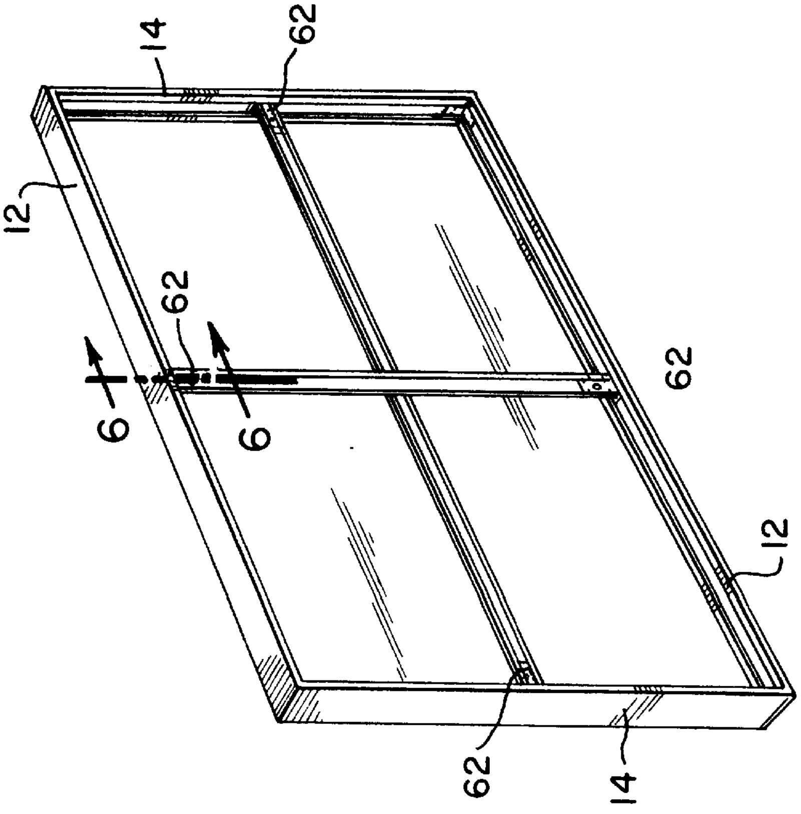
FIG. 5 is a perspective view of a rear side of an assembled picture frame showing details of two brace members, in accordance with the invention.
Figure 8:
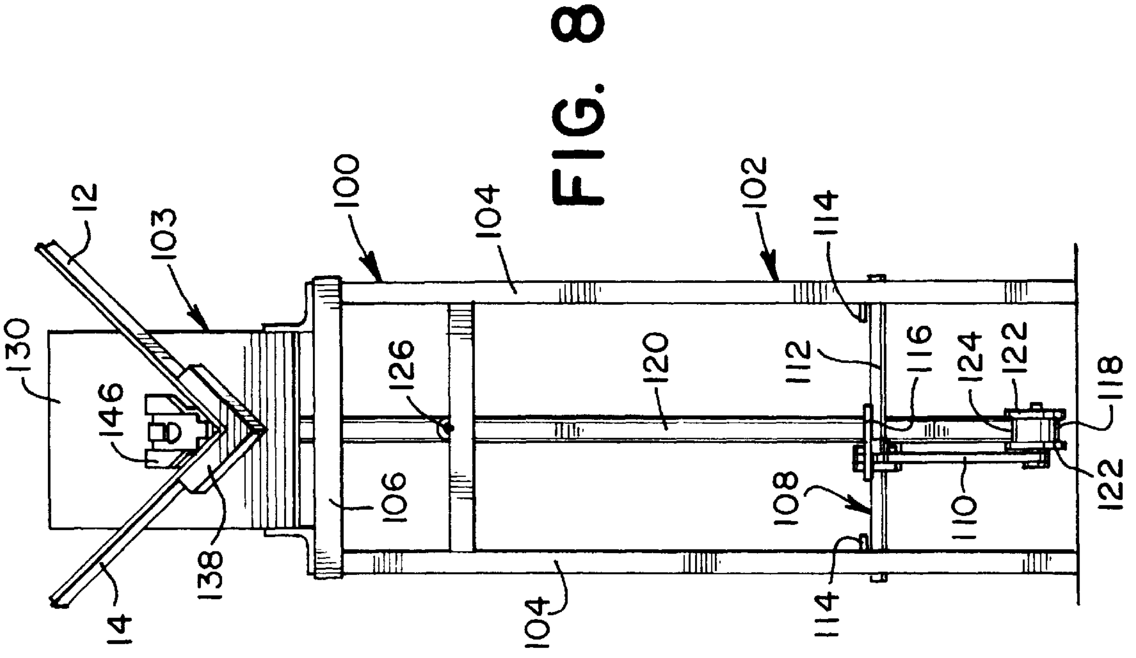
FIG. 8 is a front elevation view of the frame-member fastening machine, in accordance with the invention.

Referring to FIGS. 4–6, a bracing system in accordance with the invention is shown including a brace member 60, and a brace clip 62. Brace member 60 is elongated and preferably made from extruded or formed aluminum. Brace member 60 includes a bottom wall 64, two connected side walls 66 and two coplanar, inwardly directed flanges 68, 70. Bottom wall 64, side walls 66 and flanges 68, 70 together define a fastening channel 72, which is sized and shaped to snugly receive a crimp leg 74 of brace clip 62, as described below.

Brace clip 62 includes a transverse 90 degree bend along a transverse axis 76 and has crimp leg 74 which is similar to legs 26 of clip 10, described above, and an opposing binding leg 78. Crimp leg 74 includes slots 75 which are adapted to receive a projection of flanges 68 and 70, respectively.

Figure 1:
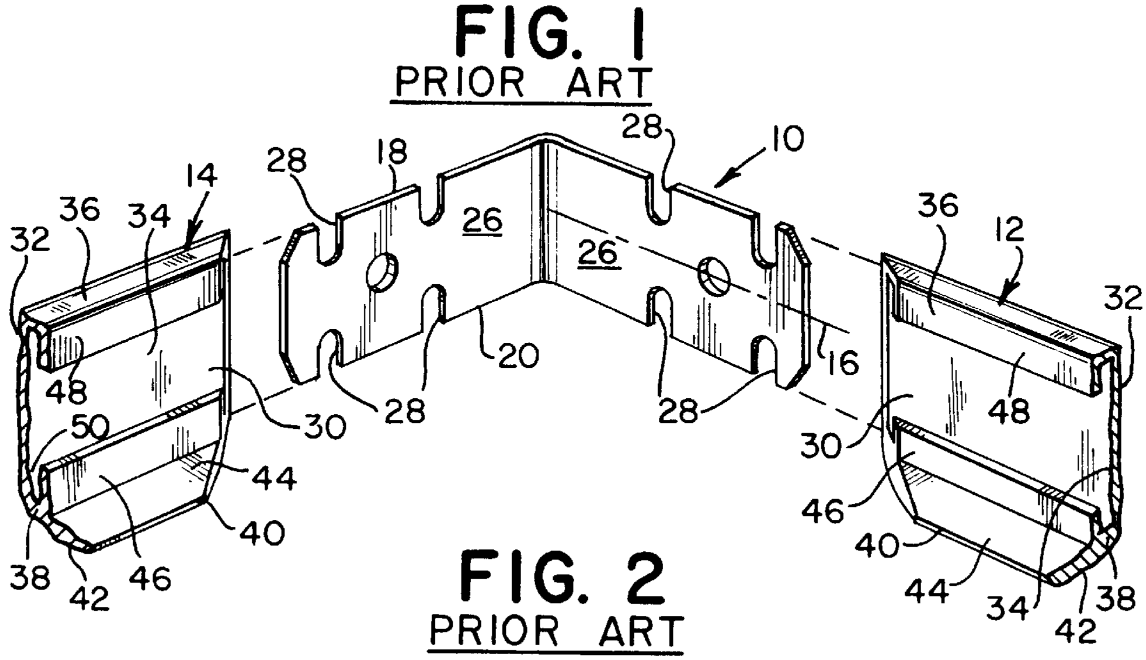
FIG. 1 PRIOR ART
FIG. 1 is a perspective view of a prior art corner fastening clip showing mitered ends of two adjacent back-loading type frame members prior to being secured together.
Figure 2:
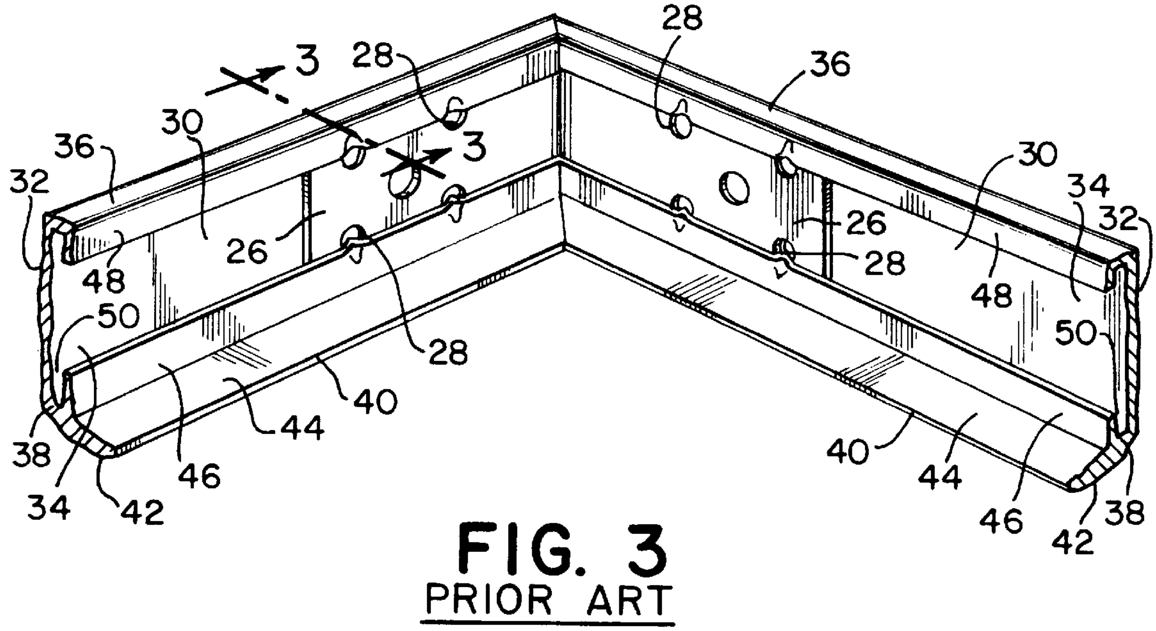
FIG. 2 PRIOR ART
FIG. 2 is a perspective view of the prior art corner fastening clip of FIG. 1, showing the clip secured within a fastening channel of each of two adjacent frame members.
Figure 3:
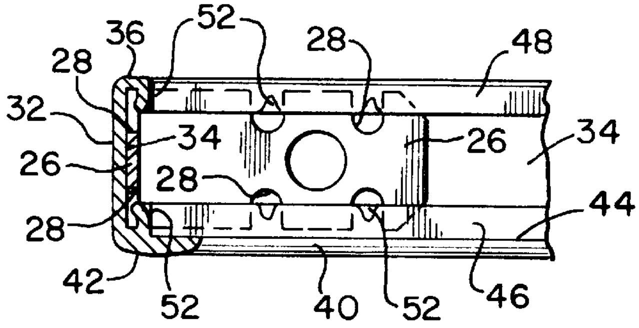
FIG. 3 PRIOR ART
FIG. 3 is a partial sectional view of the prior art fastening clip located within the fastening channel, showing details of a crimp, taken along the lines 3—3 of FIG. 2.

In operation of the bracing system according to the invention, once a back-loading type of picture frame is assembled, as described above in the Background of the Invention section (refer to FIGS. 1–3), brace member 60 may be cut to length, assembled with brace end clips, and attached to the frame. The proper length of brace member 60 is slightly shorter than the distance between two parallel and opposing frame members intended to be supported, as shown in FIG. 5. Once at least one brace member 60 is cut to length, crimp leg 74 is inserted into fastening channel 72 and selective portions of bottom wall 64 are deformed into slots 75 to hold brace clip 62 tightly within fastening channel 72. A detent 80 is located on one surface of crimp leg 74 to ensure that brace clip 62 may only be inserted into fastening channel 72 in one desired orientation, as show in FIGS. 4 and 6. Detent 80 is sized to be received in an elongated space defined between flanges 68, 70, thereby allowing entry of crimp leg 74 into fastening channel 72, yet will prevent inverted insertion of crimp leg 74 by engaging bottom wall 64 of brace member 60.

Brace member 60 may be connected to the brace clip 62 using the crimping mechanism of FIGS. 7–12 described below. The result of the crimping operation, as shown in FIG. 5A, is to deform portions of bottom wall 64 into slots 75.

Once brace member 60 is fitted with brace clips 62, the exposed binding legs 78 may be secured to the assembled back-loading type picture frame to strengthen the overall frame structure. For example, a large picture may require one (or more) brace member 60 disposed vertically and/or horizontally, as shown in FIG. 5, to provide the necessary strength to prevent warping or sagging of the frame when it is hung vertically on a wall surface. Brace members 60 are secured to frame members (12 or 14) by engaging binding leg 78 within fastening channel 50, as described below. Brace members 60 are secured to frame members (12, 14) and are generally parallel to the picture laminate.

Referring to FIG. 6, a brace member 60 is shown being secured to a back-loading type picture frame member. Upper deformable flange 48 (which is a rearmost edge of each frame member) is pried outwardly away from the center of an assembled picture frame using an appropriate tool, such as the blade of a flat-head screwdriver. After the head of the screwdriver is positioned within end clip channel 50, the handle of the tool may be moved to pry upper deformable flange 48 outwardly, against the resiliency of the frame members, to a loading position shown in dashed lines in FIG. 6. Depending on the length and material of each frame member, the operator's hand may be used to twist a middle section of a frame member outwardly, effectively prying upper deformable flange 48 outwardly.

As a portion of frame member 12, 14 is held in its loading position (dashed lines in FIG. 6), transverse access to the fastening channel 50 is provided. During this time, binding leg 78 may be inserted within fastening channel 50 in a direction which is perpendicular to the frame member. End clip 78 includes an insertion edge 82 and a shoulder 84. Insertion edge 82 is positioned within end clip channel 49, adjacent to the head of the screwdriver. Once the prying force exerted on the leverage tool is released, the resiliency of the frame member 12, 14 returns upper deformable flange 48 to its rest position (shown in solid lines in FIG. 6) so that edge 47 engages with shoulder 84 and thereby secures end clip 62 tightly within fastening channel 50.

A detent 86 is preferably provided on an outer surface of binding end 78 and is adapted to abut against inner surface 34 of frame member 12, 14 to provide a tight "binding" fit of end clip 62 within fastening channel 50. Detent 86 prevents the clip 62 from slipping within fastening channel 50 once inserted.

Brace members may be detached from within fastening channel 50 without damage to frame members 12, 14 by reinserting the tip of the tool into end clip channel 49 and again prying the frame member 12, 14 (at upper deformable edge 48) outwardly until shoulder 84 clears edge 47. Brace members 60 may be installed or removed without disturbing the assembled back-loading type of picture frame, such as the picture frame shown in FIG. 5.

Referring to FIGS. 7–12, a crimping machine 100 is shown, in accordance with the invention. The machine 100 includes a base structure 102 and a work support assembly 103. Base structure 102 preferably includes four vertically disposed legs 104 reinforced by upper section 106. A pedal operated lever assembly 108 is mounted to a lower portion of base 102 and includes an "L" shape pedal lever 110. Pedal lever 110 is pivotally attached to an axle 112. Axle 112 is horizontally mounted to base 102, supported by pedal support sections 114. Pedal lever 110 is pivotal between a rest position (shown in FIG. 7 in solid lines) and a depressed position (shown in FIG. 7 in dashed lines). A pad 116 is attached to an accessible portion of pedal lever 110 which projects from base 102. An opposing end of pedal lever 110 supports a roller 118.

Figure 7:
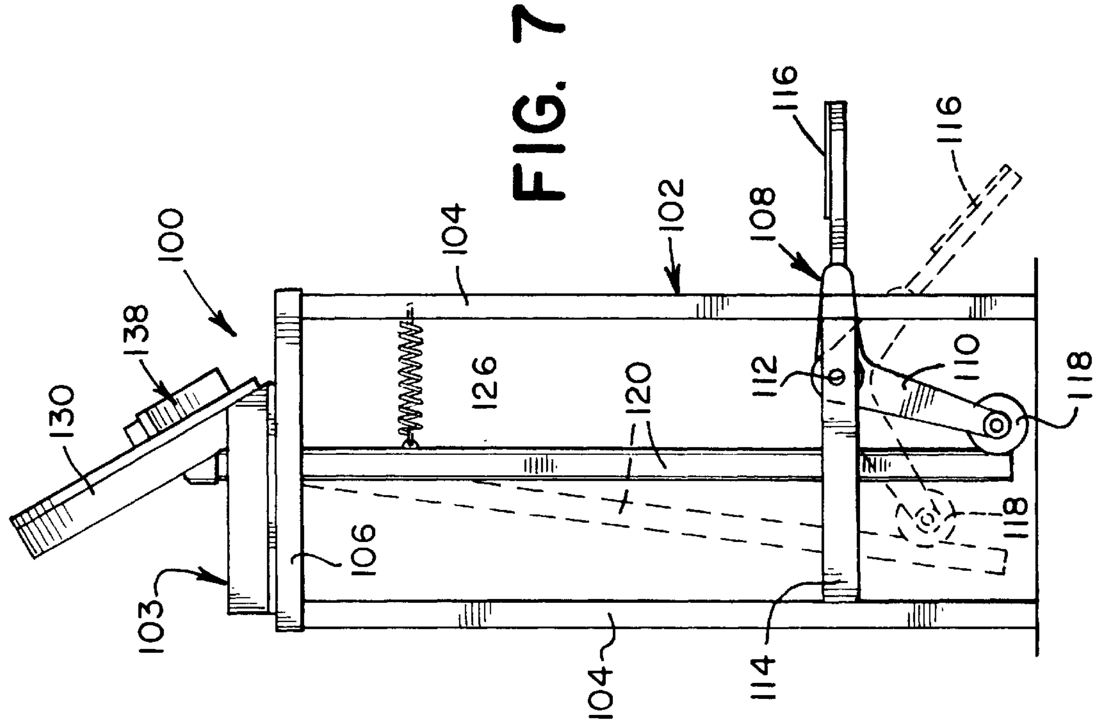
FIG. 7 is a side elevation view of a frame-member fastening machine showing an actuation pedal in a rest position and an operative position, in accordance with the invention.
Figure 11:
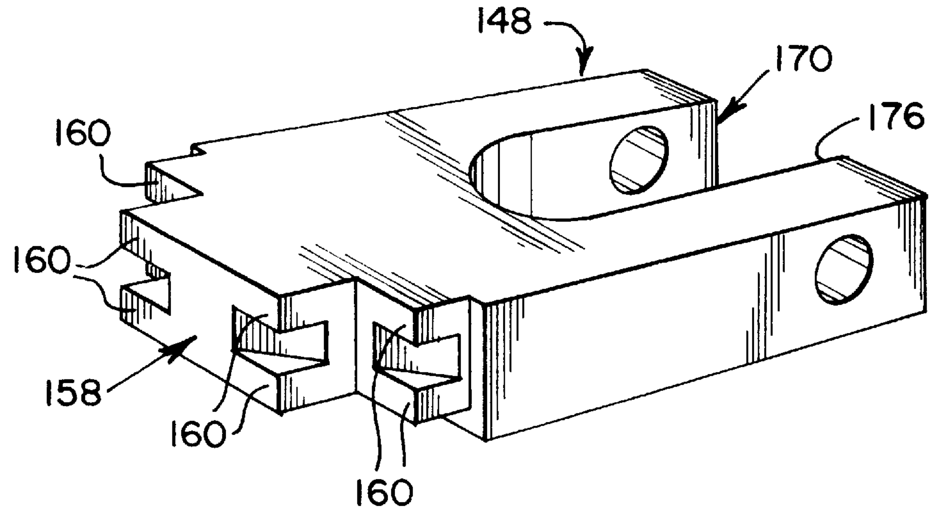
FIG. 11 is a perspective view of the crimping head, in accordance with the invention.

An actuator bar 120 is vertically supported within base 102 between legs 104 and is pivotal about an axle 121 (FIG. 10) between a rest position (shown in FIG. 7 in solid lines) and an actuated position (shown in FIG. 7 in dashed lines). Actuator bar 120 is positioned to contact roller 118. Roller 118 preferably includes two flanges 122 which define a circumferential channel 124 which is sized and shaped to receive actuator bar 120 and prevent lateral movement (parallel to axle 112). A spring 126 is attached to a forward portion of actuator bar 120 and an appropriate section of base 102 so that actuator lever is spring biased in the rest position.

Depressing pad 116 causes pedal lever 110 to pivot about axle 112 and roller 118 to roll upwardly and rearwardly along actuator bar 120. The pivotal force exerted to pedal lever 110 is translated to actuator bar 120 which, in turn, pivots about axle 121, against the action of spring 126, to its actuated position.

Figure 12:
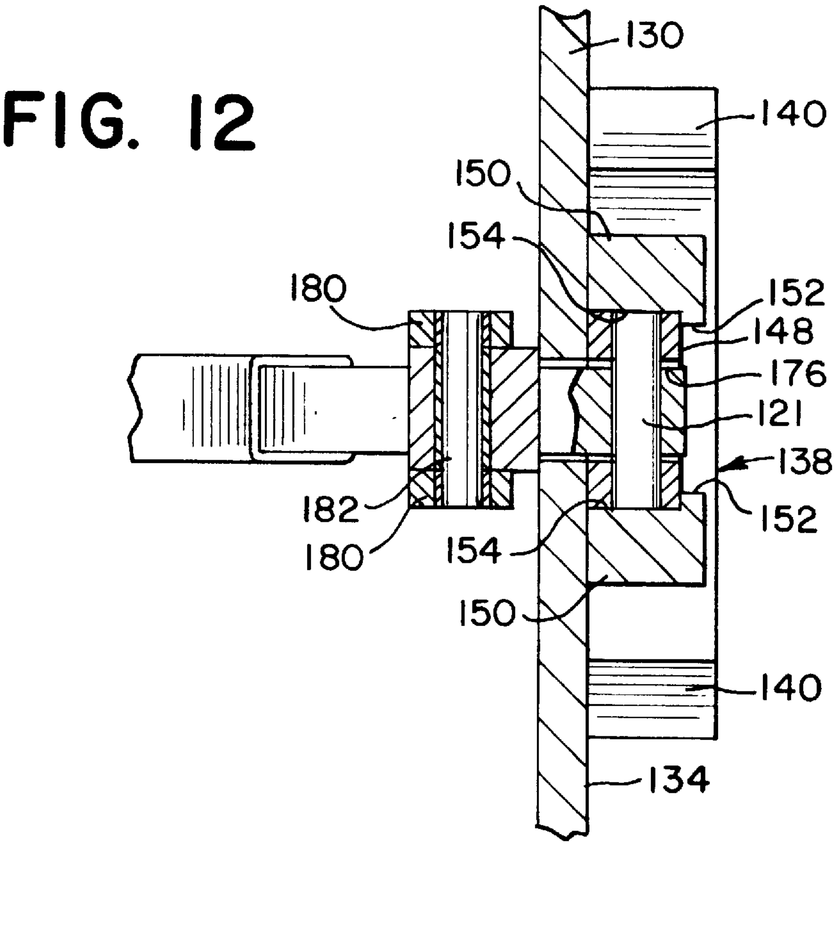
FIG. 12 is a partial sectional view of a pivot joint connecting the crimping head with an operating lever, taken along the lines 12—12 of FIG. 10.

Referring to FIGS. 9, 10 and 12, work support assembly 103 is shown including a work support table 130 which is attached to the upper end of base structure 102 at an angle between forty and eighty degrees from the horizontal. Table 130 includes a longitudinal axis 132, and an upper surface 134 having an opening 136 positioned along longitudinal axis 132. A backstop 138 is secured to table 130 (using machine bolts, not shown) below opening 136 and centered along longitudinal axis 132. Backstop 138 includes two supporting arms 140 positioned at ninety degrees with respect to each other forming a corner 142 which is positioned on longitudinal axis 132. Each supporting arm 140 includes a contact surface 144 (which is generally perpendicular to upper surface 134), against which two frame members 12, 14 are positioned and supported, as shown in FIG. 9.

Attached to table 130, over opening 136 and above backstop 138 is a slidable crimp assembly 146. Slidable crimp assembly 146 includes a slidable crimp block 148 and two mounting guide blocks 150. Mounting guide blocks 150 are secured to upper surface 134 of table 130 by appropriate machine bolts (not shown), one positioned on either side of slidable crimp block 148 so that slidable crimp block 148 may slide along a respective inwardly directed surface 152 of each mounting guide block 150. A channel 154 is provided within each inwardly directed surface 152 (see FIG. 12) which is sized and shaped to receive a portion of slidable crimp block 148 so that slidable crimp block 148 is slidable along longitudinal axis 132, yet is held flush against upper surface 134.

Each mounting guide block 150 includes a lower edge 156 which is preferably parallel to each respective supporting arm 140 so that slidable crimp-block 148 is supported close to backstop 138 while providing sufficient room to position frame members 12, 14 between backstop 138 and crimp-assembly 146.

Slidable crimp-block 148 includes a crimp-end 158 and is slidable between a rest position where crimp-end 158 is remote from backstop 138 and a crimp position where crimp-end 158 is adjacent to contact surfaces 144 of supporting arms 140. Crimp-end 158 (FIG. 11) includes crimp-elements 160 which are sized and shaped to align with slots 28 of each leg 26 of clip 10, described above. The distance between crimp-elements 160 and contact surfaces 144 when crimp-block 148 is in the crimp position (as shown in dashed lines in FIG. 9) is such that a prescribed amount of deformable flanges 46, 48 will be pressed into slots 28 without deforming any front (visible) surfaces (32, 42) of frame members 12, 14. During the crimping process, contact surfaces 144 force both frame members 12, 14 into corner 142 so that the miters of each frame in the machine 100 tightly abuts each other.

Attached to a pivot end 170 of crimp-block 148 (opposite crimp-end 158) is an elbow lever 172. Elbow lever 172 includes a first end 174 which is positioned within opening 136 and secured, within a slot 176, to crimp-block 148 using pivot pin 121. The elbow lever 172 is located behind table 130 and is pivotally attached thereto using a connecting links 180 having two openings, and two fastening pins 182, 184 (pin 184 is positioned along axis 121). The other end of elbow lever 172 is attached to actuator bar 120.

In operation, two frame members 12, 14 are selected and cut to length. Clip 10 is inserted into fastening channel 50 of each frame member, forming a non-secured corner joint. The assembled, but not yet secured, corner joint is placed onto support arms 140 of backstop 138. Each frame member 12, 14 rests on contact surfaces 144 of support arms 140 and are protected against damage during crimping.

Once frame members 12, 14 are positioned on backstop 138, within corner 142, the operator holds both frame members tightly in place using his hands (pushing the frame members together to form a tighter miter joint). The operator then presses down pedal lever 110 using one foot, which causes roller 118 to pivot about axle 112 and actuator bar 120 to pivot about axis 121. As actuator bar 120 pivots about fastening pin 184, slidable crimp-block 148 is forced downwardly in a controlled and predictable manner (by the operator) towards backstop 138 and the supported frame members 12, 14. Slidable crimp-block 148 is held flush against upper surface 134 of table 130 as it is forced from its rest position to its crimping position.

As slidable crimp-block reaches its crimping position, crimp-elements contact deformable flanges 46, 48 of each frame member 12, 14 and deform or emboss a portion of each frame member 12, 14 (press points 52) into aligned slots 28 of clip 10. The embossed portion of frame members 12, 14 or press points 52 located within each slot 28 tightly holds each frame member together. The crimping action forces each frame member 12, 14 tightly into corner 142 prior to and during the final crimping process which ensures that a tight miter joint between two secured frame members 12, 14 will be formed.

Brace members 60 may also be positioned against backstop 138 of crimp machine 100 with an end-clip 62 positioned within fastening channel 72. In such instance, crimp-elements 160 will engage only bottom wall 64 to force a portion of brace member 60 into slots 75 to tightly fasten end-clip 62 to brace member 60.

Once crimped, the operator releases the downward force applied to pedal lever 110 allowing spring 126 to return actuator 120 to its rest position and thereby also raise slidable crimp-block 148 to its rest position, away from backstop 138 and away from the now crimped and secured frame members 12, 14 (or brace member 60/end-clip 62), allowing the operator to remove the secured frame members.

Crimping machine 100, in accordance with the invention is self contained, free standing, easily portable and requires no support services such as electricity, compressed air or a source of pressurized hydraulic fluid. Crimping machine 100 of the present invention is therefore easily affordable by owners of small framing stores and is easy to use, requiring no substantial training.

Press points 52 may be chosen with respect to the corresponding location of slots 28 of a fitted clip 10 so that deformed portions of deformable flanges 46, 48 actually draw (or otherwise force) the respective fitted leg 26 of clip 10 inwardly farther into fastening channel 50, thereby effectively pushing each mitered end of each adjacent frame member tightly together.

What is claimed is:

1. A portable crimping machine for securing an elongated frame member to a clip, said crimping machine comprising:

a base having an upper portion;

a table attached to said upper portion of said base;

a foot-operated lever pivotally attached to said base, said foot-operated lever having a pedal at an accessible end and a roller at the other end, and being movable between a rest position and a depressed position;

a crimping assembly mounted to said table, said crimping assembly including a backstop for supporting said frame member and said clip, and a crimp block having crimping elements which are adapted to crimp a selected portion of said frame member into engagement with said clip, said crimp block being movable along a crimping axis between a rest position wherein said crimping elements are remote from said backstop and a crimping position wherein said crimping elements are adjacent to said backstop, said crimping elements being fixed with respect to said crimp block during crimping, and means for translating movement of said foot-operated lever from said rest position to said depressed position into corresponding movement of said crimp block from its rest position to said crimping position so that movement of said foot-operated lever selectively forces said crimping elements to crimp selective portions of said frame into said clip.

2. A portable crimping machine for securing an elongated frame member to a clip, said crimping machine comprising:

a base having an upper portion;

a table attached to said upper portion of said base;

a crimping assembly mounted to said table, said crimping assembly including a backstop for supporting said frame member and said clip, and a crimp block having crimping elements which are adapted to crimp a selected portion of said frame member into engagement with said clip, said crimp block being movable along a crimping axis between a rest position wherein said crimping elements are remote from said backstop and a crimping position wherein said crimping elements are adjacent to said backstop, said crimping elements being fixed with respect to said crimp block during crimping, and a movable lever attached to said crimp block so that movement of said lever with respect to said frame selectively forces said crimp block from said rest position to said crimping position.

3. A portable crimping machine according to claim 1, wherein said backstop for supporting said frame member and said clip is V-shaped defining a corner, and adapted to simultaneously support two frame members and a corner clip at a predetermined angle.

4. A portable crimping machine according to claim 2, wherein said backstop for supporting said frame member and said clip is V-shaped defining a corner, and adapted to simultaneously support two frame members and a corner clip at a predetermined angle.

5. A portable crimping machine according to claim 3, wherein said crimping assembly includes means to force said two frame members towards said corner during crimping.

6. A portable crimping machine according to claim 4, wherein said crimping assembly includes means to force said two frame members towards said corner during crimping.

* * * * *